(12) United States Patent
Sera et al.

(10) Patent No.: US 10,336,220 B2
(45) Date of Patent: Jul. 2, 2019

(54) VEHICLE SEAT

(71) Applicant: TOYOTA BOSHOKU KABUSHIKI KAISHA, Aichi-ken (JP)

(72) Inventors: Hidefumi Sera, Aichi-ken (JP); Hideki Fujisawa, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/946,216

(22) Filed: Apr. 5, 2018

(65) Prior Publication Data
US 2018/0290566 A1 Oct. 11, 2018

(30) Foreign Application Priority Data
Apr. 6, 2017 (JP) ................. 2017-075778

(51) Int. Cl.
*B60N 2/30* (2006.01)
*B60N 2/90* (2018.01)

(52) U.S. Cl.
CPC ........... *B60N 2/3045* (2013.01); *B60N 2/995* (2018.02)

(58) Field of Classification Search
CPC ............................. B60N 2/3045; B60N 2/995
USPC ...... 297/284.11, 311, 332, 334, 335, 423.28, 297/423.3, 378.12, 378.14
See application file for complete search history.

(56) References Cited

U.S. PATENT DOCUMENTS

| | | | | | |
|---|---|---|---|---|---|
| 5,156,437 A | * | 10/1992 | Hayakawa | ............. | B60N 2/071 297/335 |
| 5,156,438 A | * | 10/1992 | Hayakawa | ............. | B60N 2/071 297/335 |
| 5,158,338 A | * | 10/1992 | Hayakawa | ......... | B60N 2/01591 297/335 |
| 5,195,802 A | * | 3/1993 | Hayakawa | ............. | B60N 2/366 297/334 |
| 5,800,015 A | * | 9/1998 | Tsuchiya | ............... | B60N 2/0715 297/331 X |
| 6,012,771 A | * | 1/2000 | Shea | ........................ | B60N 2/36 297/332 X |
| 6,095,610 A | * | 8/2000 | Okajima | ................ | B60N 2/995 297/423.28 X |
| 6,474,741 B2 | * | 11/2002 | Kamida | ............... | B60N 2/0292 297/335 X |

(Continued)

FOREIGN PATENT DOCUMENTS

JP 2013-112128 6/2013

*Primary Examiner* — Rodney B White
(74) *Attorney, Agent, or Firm* — Greenblum & Bernstein, P.L.C.

(57) ABSTRACT

According to an illustrative embodiment of the present disclosure, there is provided a vehicle seat including: a seat cushion that serves as a seating portion which receives a load of an occupant; an ottoman that is connected to a front portion of the seat cushion; a base that supports the seat cushion from a vehicle floor in a seating position at which the seat cushion receives the occupant and in a tip-up position at which the seat cushion is tipped up rearward from the seating position; and a folding mechanism that moves the ottoman between an initial position at which the ottoman is positioned at the front portion of the seat cushion and a folding position at which the ottoman is retracted beneath the seat cushion in accordance with a movement of the seat cushion from the seating position and the tip-up position.

6 Claims, 6 Drawing Sheets

(56) References Cited

U.S. PATENT DOCUMENTS

| | | | | |
|---|---|---|---|---|
| 6,742,841 | B1* | 6/2004 | Soditch | A47C 7/56 297/335 |
| 6,767,061 | B2* | 7/2004 | Ogino | B60N 2/1839 297/331 X |
| 6,883,854 | B2* | 4/2005 | Daniel | B60N 2/01541 297/334 X |
| 6,883,868 | B2* | 4/2005 | Yoshida | B60N 2/065 297/331 |
| 6,916,057 | B2* | 7/2005 | Teich | B60N 2/3045 297/331 X |
| 7,040,702 | B2* | 5/2006 | Yamada | B60N 2/3009 297/331 X |
| 7,086,696 | B2* | 8/2006 | Yudovich | B60N 2/3047 297/335 X |
| 7,229,134 | B2* | 6/2007 | Ito | B60N 2/0232 297/423.28 X |
| 7,252,318 | B2* | 8/2007 | Sumida | B60N 2/01 296/64 |
| 7,252,320 | B2* | 8/2007 | Tsujibayashi | B60N 2/01583 297/335 X |
| 7,293,835 | B2* | 11/2007 | Yudovich | B60N 2/0155 297/335 X |
| 7,374,242 | B2* | 5/2008 | Champ | B60N 2/3031 297/331 X |
| 7,429,083 | B2* | 9/2008 | Tsuji | B60N 2/995 297/423.28 X |
| 7,578,537 | B2* | 8/2009 | Baetz | B60N 2/3013 296/65.09 |
| 7,611,200 | B2* | 11/2009 | Jovicevic | B60N 2/2209 297/331 X |
| 7,731,296 | B2* | 6/2010 | Tsuda | B60R 22/02 297/331 X |
| 7,780,234 | B2* | 8/2010 | Grable | B60N 2/305 297/331 X |
| 7,866,755 | B2* | 1/2011 | Okano | B60N 2/995 297/423.3 |
| 7,901,005 | B2* | 3/2011 | Khan | B60N 2/3013 297/331 |
| 7,914,077 | B2* | 3/2011 | Linkner | B60N 2/01583 297/331 X |
| 8,016,355 | B2* | 9/2011 | Ito | B60N 2/62 297/284.11 |
| 8,104,834 | B2* | 1/2012 | Moegling | B60N 2/20 297/331 X |
| 8,152,240 | B2* | 4/2012 | Yamada | B60N 2/22 297/334 X |
| 8,376,442 | B1* | 2/2013 | Brantley | B60N 2/24 296/65.09 |
| 8,434,808 | B2* | 5/2013 | Abe | B60N 2/3013 297/331 X |
| 8,444,223 | B2* | 5/2013 | Moegling | B60N 2/3013 297/331 X |
| 8,567,868 | B2* | 10/2013 | Kuno | B60N 2/995 297/423.3 |
| 8,573,674 | B2* | 11/2013 | Otsuka | B60N 2/0715 297/331 X |
| 8,573,696 | B2* | 11/2013 | Kuno | A47C 7/506 297/284.11 |
| 8,646,840 | B2* | 2/2014 | Stojanovic | B60N 2/26 297/331 X |
| 8,876,212 | B2* | 11/2014 | Yamada | B60N 2/02 297/423.28 X |
| 8,944,513 | B2* | 2/2015 | Suzuki | B60N 2/995 297/423.28 X |
| 8,960,783 | B2* | 2/2015 | Holder | B60N 2/3011 296/65.09 |
| 8,960,785 | B2* | 2/2015 | Kuno | B60N 2/62 297/284.11 |
| 9,198,516 | B2* | 12/2015 | Yamada | B60N 2/995 |
| 9,573,490 | B1* | 2/2017 | Poniatowski | B60N 2/2245 |
| 9,987,954 | B2* | 6/2018 | Kimata | B60N 2/68 |
| 10,065,536 | B2* | 9/2018 | Poniatowski | B60N 2/938 |
| 2004/0212237 | A1* | 10/2004 | Epaud | B60N 2/06 297/331 |
| 2008/0100112 | A1* | 5/2008 | Hausler | B60N 2/2209 297/331 |
| 2008/0122279 | A1* | 5/2008 | Park | B60N 2/01 297/332 |
| 2009/0295185 | A1* | 12/2009 | Abe | B60N 2/3013 296/65.09 |
| 2011/0006573 | A1* | 1/2011 | Arakawa | B60N 2/0232 297/284.11 |
| 2012/0175930 | A1* | 7/2012 | Jovicevic | B60N 2/12 297/331 |
| 2013/0038107 | A1* | 2/2013 | Tamura | B60N 2/0232 297/331 |
| 2017/0341543 | A1* | 11/2017 | Fujisawa | B60N 2/995 |
| 2018/0339628 | A1* | 11/2018 | Kimura | B60N 2/995 |
| 2018/0339629 | A1* | 11/2018 | Kimura | B60N 2/995 |

* cited by examiner

VEHICLE SEAT

CROSS-REFERENCE TO RELATED APPLICATION

This application claims priorities from Japanese Patent Application No. 2017-075778 filed on Apr. 6, 2017, the entire subject matters of which is incorporated herein by reference.

TECHNICAL FIELD

The present disclosure relates to a vehicle seat which includes a seat cushion serving as a seating portion, an ottoman connected to a front portion of the seat cushion, and a base supporting the seat cushion to a vehicle floor in a state where the seat cushion is tipped up rearward from a seating position to a predetermined tip-up position.

BACKGROUND

In the related art, there is known a vehicle seat which includes a folding mechanism to fold the ottoman toward the bottom of the seat cushion while performing a tip-up operation to tip up the seat cushion rearward (JP-A-2013-112128). The folding mechanism is configured such that a link is used to connect a base supporting the seat cushion and an ottoman connected to the front portion of the seat cushion. The folding mechanism is configured to fold the ottoman by retracting the ottoman toward the bottom of the seat cushion by the link as the seat cushion is folded. The folding mechanism is configured to return to a previous state where the ottoman has been pressed and folded toward the front portion of the seat cushion by the link while falling the seat cushion from a tipping-up position onto a floor.

In the related art described above, the folding mechanism is configured to start folding the ottoman by the link at the same time as the seat cushion is tipped up. Therefore, there is a concern that the ottoman may be not appropriately folded or do not return to the previous state due to tolerance of the link.

SUMMARY

The present disclosure is made in consideration of the above-mentioned circumstances, and one of objects of the present disclosure is to provide a vehicle seat that is capable to switch the ottoman to a folded state appropriately while performing a tip-up operation on the seat cushion.

According to an illustrative embodiment of the present disclosure, there is provided a vehicle seat including: a seat cushion that serves as a seating portion which receives a load of an occupant; an ottoman that is connected to a front portion of the seat cushion; a base that supports the seat cushion from a vehicle floor in a seating position at which the seat cushion receives the occupant and in a tip-up position at which the seat cushion is tipped up rearward from the seating position; and a folding mechanism that moves the ottoman between an initial position at which the ottoman is positioned at the front portion of the seat cushion and a folding position at which the ottoman is retracted beneath the seat cushion in accordance with a movement of the seat cushion from the seating position and the tip-up position. The folding mechanism includes: a hinge portion that rotatably connects the ottoman to the front portion of the seat cushion; a lock portion that locks rotation of the ottoman about the hinge portion at the initial position; and an operation link that connects the ottoman and the base and retracts the ottoman from the initial position to the folding position as the seat cushion is tipped up. The lock portion is configured to lock the rotation of the ottoman at the initial position in a state where the seat cushion is at the seating position and to unlock the rotation of the ottoman in a state where the seat cushion is tipped up to a first intermediate position which is set between the initial position and the tip-up position. The operation link includes an adjustment portion that adjusts a separation movement amount of the ottoman with respect to the base during the movement of the seat cushion between the seating position and a second intermediate position which is set between the first intermediate position and the tip-up position. The operation link retracts the ottoman from the initial position to the folding position during the movement of the seat cushion between the second intermediate position and the tip-up position.

DETAILED DESCRIPTION

In the following, embodiments according to the present disclosure will be described using the drawings.

A configuration of a seat 1 (vehicle seat) according to a first embodiment will be described while referring to FIGS. 1 to 6. In the following explanation, all directions such as front, rear, up, down, right, and left indicate the directions depicted in the respective drawings. In the case of "seat width direction", it indicates a right and left direction of the seat 1. In the case of "seat height direction", it indicates an up and down direction of the seat 1. In the case of "seat longitudinal direction", it indicates a front and rear direction of the seat 1.

Figure 1:
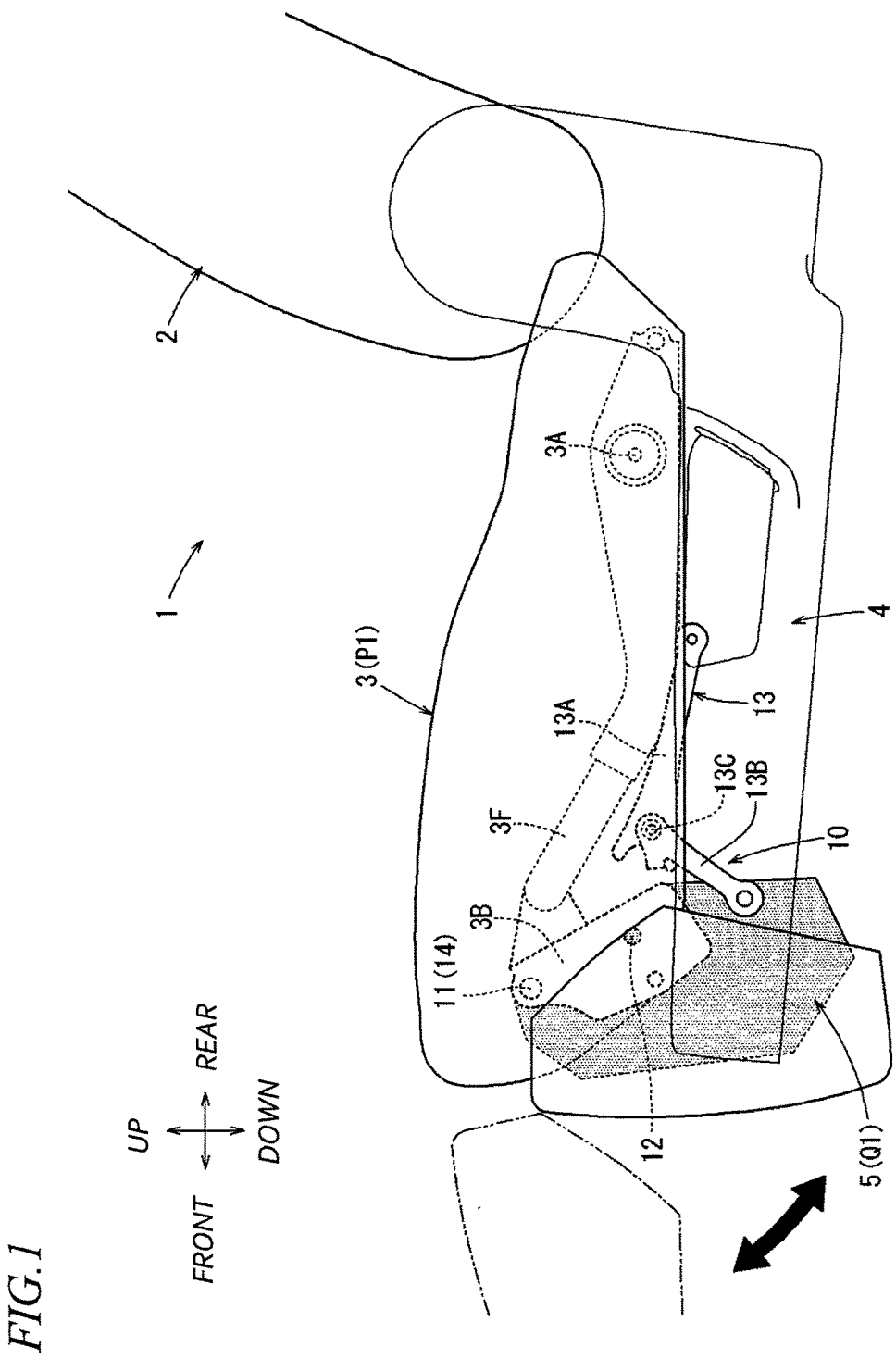
FIG. 1 is a side view schematically illustrating a configuration of a vehicle seat of a first embodiment.

The seat 1 according to this embodiment is configured as a rear seat of a vehicle as illustrated in FIG. 1, and includes a seat back 2 serving as a backrest of an occupant, a seat cushion 3 serving as a seating portion, a base 4 supporting the seat back 2 and the seat cushion 3 with respect to a vehicle floor, and an ottoman 5 serving as a footstool of the occupant.

The seat back 2 is configured such that lower ends on the right and left sides are connected to rear ends on the right and left sides of the base 4 through recliners (not illustrated). With this connection, the seat back 2 is held in a state where the backrest angle is fixed in normal condition. The seat back 2 is configured such that the fixed state of the backrest angle is released when a tip-up lever (not illustrated) provided on an outer side of the base 4 is operated, and pulled ahead and held up to a position of a forward-bent posture illustrated in FIG. 2 by an urging force.

The seat cushion 3 is configured such that the rear portions on the right and left sides are rotatably hinge-connected at the rear portions on the right and left sides of the base 4 with a hinge shaft 3A, which faces in an axial direction at positions in the seat width direction. The seat cushion 3 is connected to the base 4 through a tip-up mechanism (not illustrated). With this connection, the seat cushion 3 is fixed in the state of being fallen onto the base 4 at a seating position P1 in normal condition as illustrated in FIG. 1, and is held in this state the occupant may be seated thereon.

The seat cushion 3 is configured such that the fixed state at the seating position P1 with respect to the base 4 is released when the tip-up lever (not illustrated) is operated. The seat cushion 3 is tipped up rearward to a predetermined tip-up position P4 illustrated in FIG. 2 about the hinge shaft 3A by an urging force and is held. With the tipping-up, the seat cushion 3 is switched to the state of being overlapped in the seat longitudinal direction with the pulled-ahead seat back 2 the forward-bent position.

Therefore, the seat back 2 and the seat cushion 3 are switched to be folded compactly in the seat longitudinal direction by a tip-up operation in which the seat cushion 3 is tipped rearward at the same time when the seat back 2 is pulled ahead. After the tip-up operation, the entire seat 1 is slid toward the front side by a slide rail (not illustrated) which is provided between the base 4 and the vehicle floor. Therefore, a space where the seat 1 is installed can be switched to be a wide space to the rear side.

As illustrated in FIG. 1, the ottoman 5 is provided in the front side of the seat cushion 3 and has a development and storage mechanism (not illustrated). With this configuration, in a state where the seat cushion 3 is located at the seating position P1, the ottoman 5 is held in a state at a storage position (a state depicted with a solid line in FIG. 1) in which the ottoman is stored compactly along the front portion of the seat cushion 3 between uses. The ottoman 5 is configured such that the fixed state of a movable member is released by operating a lever (not illustrated) provided at a predetermined place of the seat 1, and the movable member is erected in a front-rising state from the front portion of the seat cushion 3 by an urging force. Thus, the ottoman 5 is developed to be a state where the occupant puts on a lower leg portion on the upper side thereof (a state depicted with a virtual line in FIG. 1).

Figure 2:
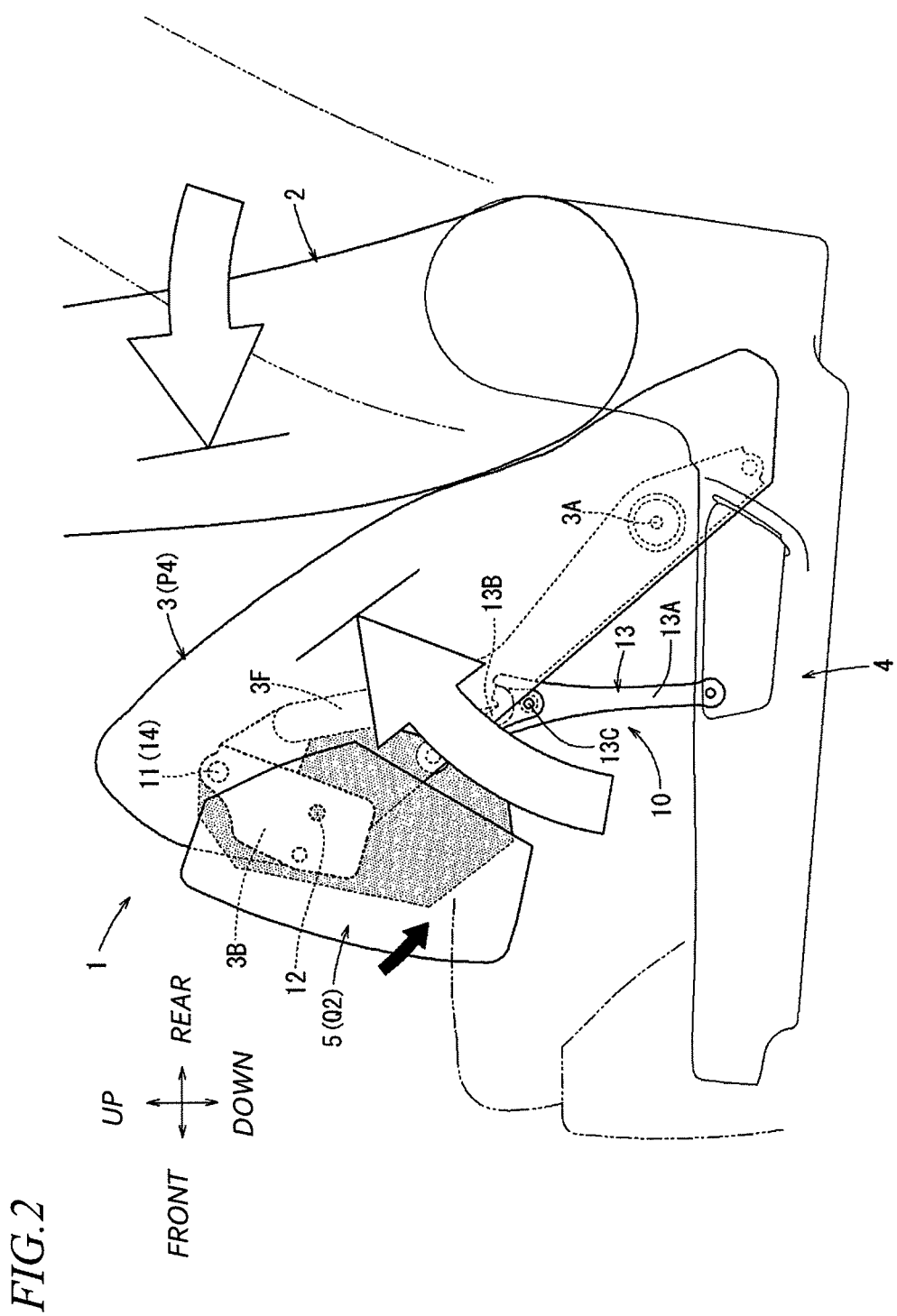
FIG. 2 is a side view illustrating a state of switching the vehicle seat to a tip-up posture.

When the seat cushion 3 is tipped up toward the predetermined tip-up position P4 illustrated in FIG. 2 when the tip-up lever (not illustrated) is operated, the ottoman 5 is switched from a state at an initial position Q1 at which the movable member is stored along the front portion of the seat cushion 3 illustrated in FIG. 1 to a state at a folding position Q2 at which the ottoman 5 is folded to the bottom of the seat cushion 3. When the seat cushion 3 is fallen down from the predetermined tip-up position P4 illustrated in FIG. 2 toward the seating position P1 on the base 4 described using FIG. 1, the ottoman 5 returns from the folding position Q2 to the state of the initial position Q1 along the front portion of the seat cushion 3.

The movements for drawing the ottoman 5 in and out to tip up or fall down the seat cushion 3 are performed by the operation of a folding mechanism 10 which is provided between the ottoman 5 and the base 4. In the following, a specific configuration of the folding mechanism 10 will be described in detail. In the following explanation, the ottoman 5 is configured to move as one set in the state of being unused as a footstool (that is, the movable member is stored). Therefore, a structure of the one set is representatively described as a structure which is a hatched portion of the ottoman 5 illustrated in FIGS. 1 to 6.

Figure 3:
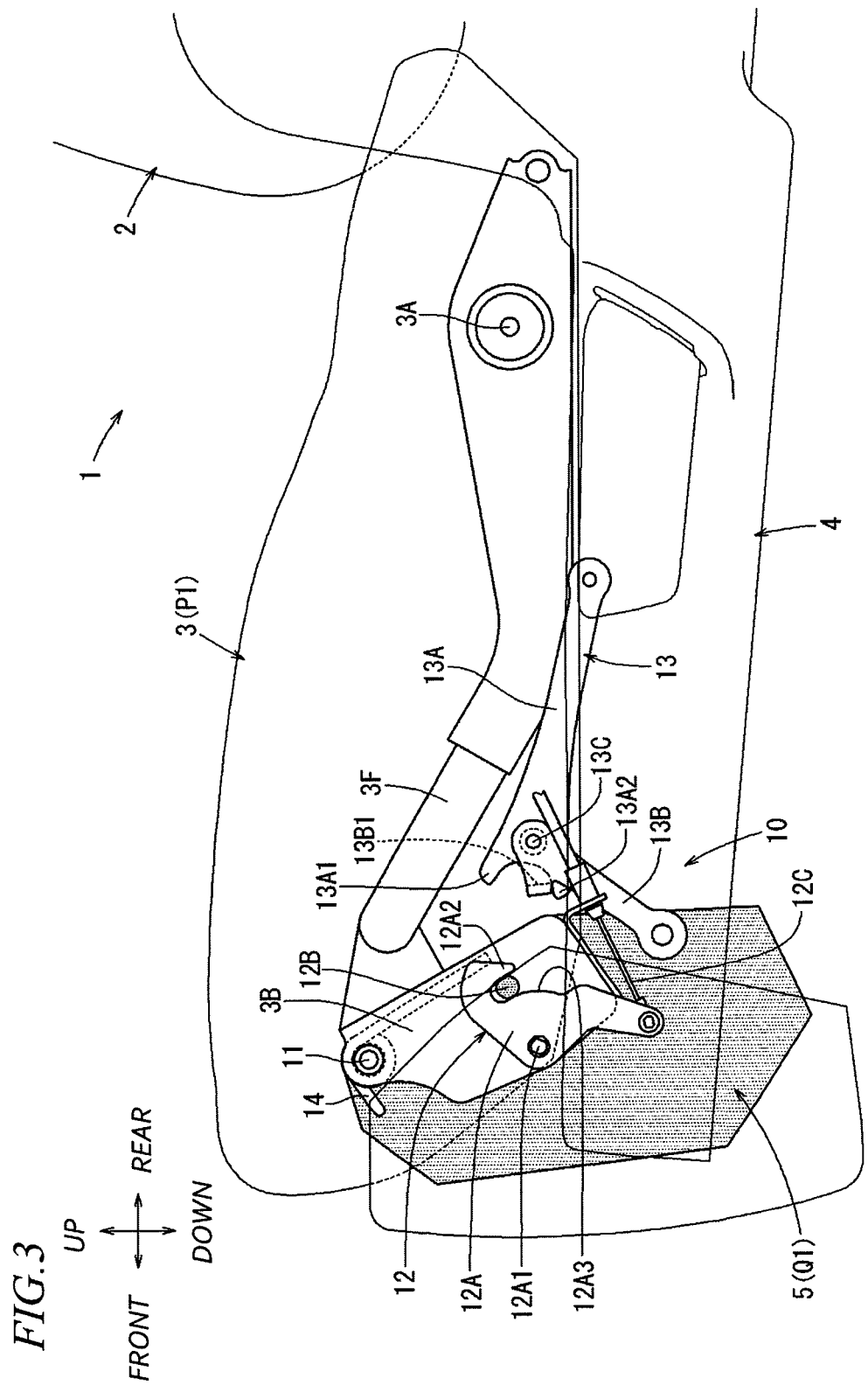
FIG. 3 is an enlarged view schematically illustrating main structures when a seat cushion is located at a seating position.

As illustrated in FIG. 3, the folding mechanism 10 includes a hinge shaft 11 which rotatably hinge-connects the ottoman 5 to the front portion of the seat cushion 3, a lock portion 12 which locks the rotation of the ottoman 5 about the hinge shaft 11 at the initial position Q1, an operation link 13 which is connected between the ottoman 5 and the base 4 to retract the ottoman 5 from the initial position Q1 to the folding position Q2 along the tipping-up movement of the seat cushion 3, and a torsion spring 14 which is mounted in the hinge shaft 11 to be attached between the ottoman 5 and the front portion of the seat cushion 3. Herein, the hinge shaft 11 corresponds to "hinge portion" of the invention, and the torsion spring 14 corresponds to "urging portion" of the invention.

The hinge shaft 11 is configured to be connected, in the state of being rotatable about an axis extending in the seat width direction, to a support bracket 3B which integrally combines the upper end of the ottoman 5 to the front portion of a cushion frame 3F forming a framework of the seat cushion 3. The lock portion 12 includes a hook 12A which is rotatably provided in the support bracket 3B, a striker 12B which is a round rod shape and integrally provided in the ottoman 5, and a cable 12C which connects the hook 12A and the base 4.

The hook 12A is rotatably hinge-connected to the support bracket 3B by a connection shaft 12A1 which faces in the axial direction in the seat width direction. At a place after extending from the connection shaft 12A1 in the hook 12A toward the rear upper side, there is formed a hooking portion 12A2 of a downward opening shape which is rotatably hung in the striker 12B from the upper side. In a surface on the rear side of the hook 12A, there is formed an arc surface portion 12A3 which is bent in an arc shape from a region inside the opening of the hooking portion 12A2 to a region protruding to the lower side of the hooking portion 12A2. The arc surface portion 12A3 is formed bent in an arc shape about the connection shaft 12A1 with the hook 12A as a rotation center. Herein, the arc surface portion 12A3 corresponds to a regulation portion of the invention.

The hook 12A of the above configuration is rotatably urged in the clockwise direction about the connection shaft 12A1 by a spring (not illustrated) which is attached with respect to the support bracket 3B in normal condition, and is held in a state where the hooking portion 12A2 is hung on the striker 12B to stop the rotation of the ottoman 5. With the stopping of the rotation, the ottoman 5 is integrally fixed to the front portion of the seat cushion 3, so that the ottoman 5 can be switched to the use state (a state depicted with the virtual line in FIG. 1) by erecting a movable member (not illustrated) to be the front-rising state on the basis of a fixing portion (not illustrated) fixed at a home position. The ottoman 5 can be switched to the state at the storage position in which the movable member is folded and overlapped at the fixing portion (the state depicted with a solid line in FIG. 1).

Figure 4:
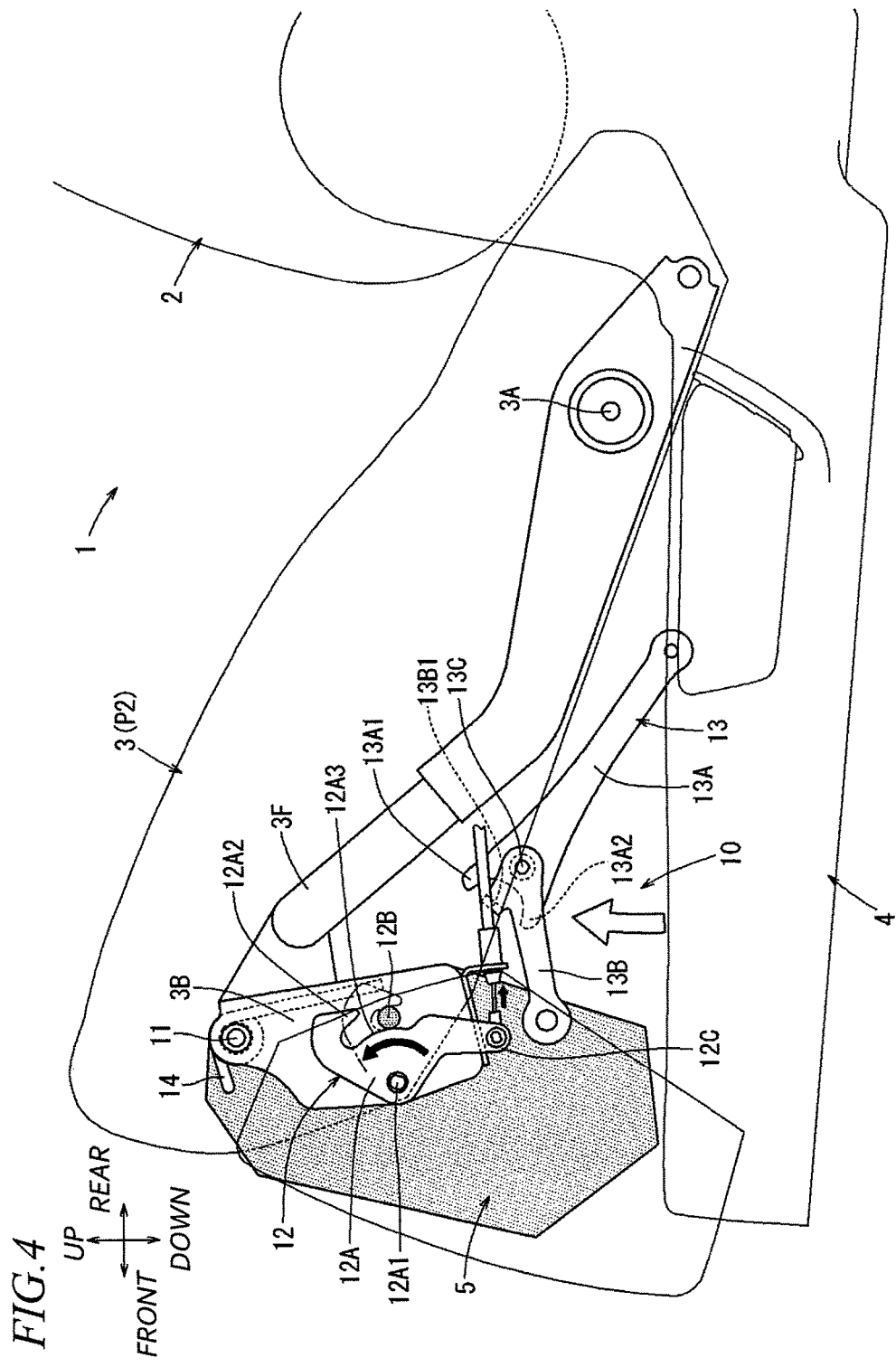
FIG. 4 is a view schematically illustrating a state where the seat cushion is tipped up to an first intermediate position and a lock portion is released.

As illustrated in FIG. 3, the striker 12B is formed as a member of a round rod shape which is attached to the ottoman 5 in a straightly extending manner in the seat width direction. The cable 12C is connected between the hook 12A and the base 4. As illustrated in FIG. 4, the hook 12A is configured to be towed and released from the hung state to the striker 12B along the tipping-up movement of the seat cushion 3 by a relative distance in movement generated between the hook 12A and the base 4. Specifically, the cable 12C is configured to operate the hook 12A to be released from the hung state to the striker 12B when the seat cushion 3 moves to be tipped up from the seating position P1 illustrated in FIG. 3 to the first intermediate position P2 illustrated in FIG. 4.

The cable 12C is configured such that the seat cushion 3 proceeds to move to be tipped up when the seat cushion 3 moves to be tipped up forward from the first intermediate position P2. However, the cable 12C is configured not to allow an excessive movement using a cancel structure (not illustrated) provided in the connection portion with respect to the base 4 so as to hold the hook 12A at the home position not to be towed any farther. The cable 12C is returned to the seating position P1 illustrated in FIG. 3 after the seat cushion 3 is tipped up. Thus, the towed state of the hook 12A is released, and the cable 12C is returned to the hung state to the striker 12B by urging the hook 12A.

The operation link 13 is formed in a bending link which can link in a bending and stretching shape. The bending link includes a first link 13A of which one end is rotatably pin-connected to the base 4, a second link 13B of which one end is rotatably pin-connected to a lower end of the ottoman 5, and a joint 13C which rotatably pin-connects the other end of the first link 13Aa and the other end of the second link 13B. The operation link 13 includes an engaging piece 13B1 which is bent and protrudes in the axial direction from a place near the end on the other side connected by the joint 13C of the second link 13B. The engaging piece 13B1 is inserted between a first protruding piece 13A1 extending obliquely upward from the end on the other side connected by the joint 13C of the first link 13A and a second protruding piece 13A2 extending obliquely downward.

With this configuration, the operation link 13 can make the first link 13A and the second link 13B bend and stretch while being linked together within a rotating range where the engaging piece 13B1 of the second link 13B abuts on and engaged with the first protruding piece 13A1 and the second protruding piece 13A2 of the first link 13A. As described above, the operation link 13 is configured to make the first link 13A and the second link 13B bend and stretch together within a certain range. Therefore, even if the seat cushion 3 is tipped up to a certain range from the base 4, the operation link 13 does not operate the ottoman 5 in a retracting direction with respect to the base 4.

Specifically, in a state where the seat cushion 3 is at the seating position P1 as illustrated in FIG. 3, the operation link 13 is configured such that the engaging piece 13B1 of the second link 13B is located at an first intermediate position separated from the first protruding piece 13A1 and the second protruding piece 13A2 of the first link 13A. The first link 13A and the second link 13B are held in a bent shape like a mountain shape.

As illustrated in FIG. 4, the operation link 13 is configured to gradually extend in the bent shape by a relative distance in movement generated between the ottoman 5 and the base 4 along the tipping-up movement of the seat cushion 3. With this configuration, the operation link 13 releases the relative distance in movement generated between the ottoman 5 and the base 4 instead of starting to retract the ottoman 5 with respect to the base 4 even when the seat cushion 3 is tipped up to the first intermediate position P2 illustrated in FIG. 4 and thus the hook 12A of the lock portion 12 comes out of the striker 12B.

Figure 5:
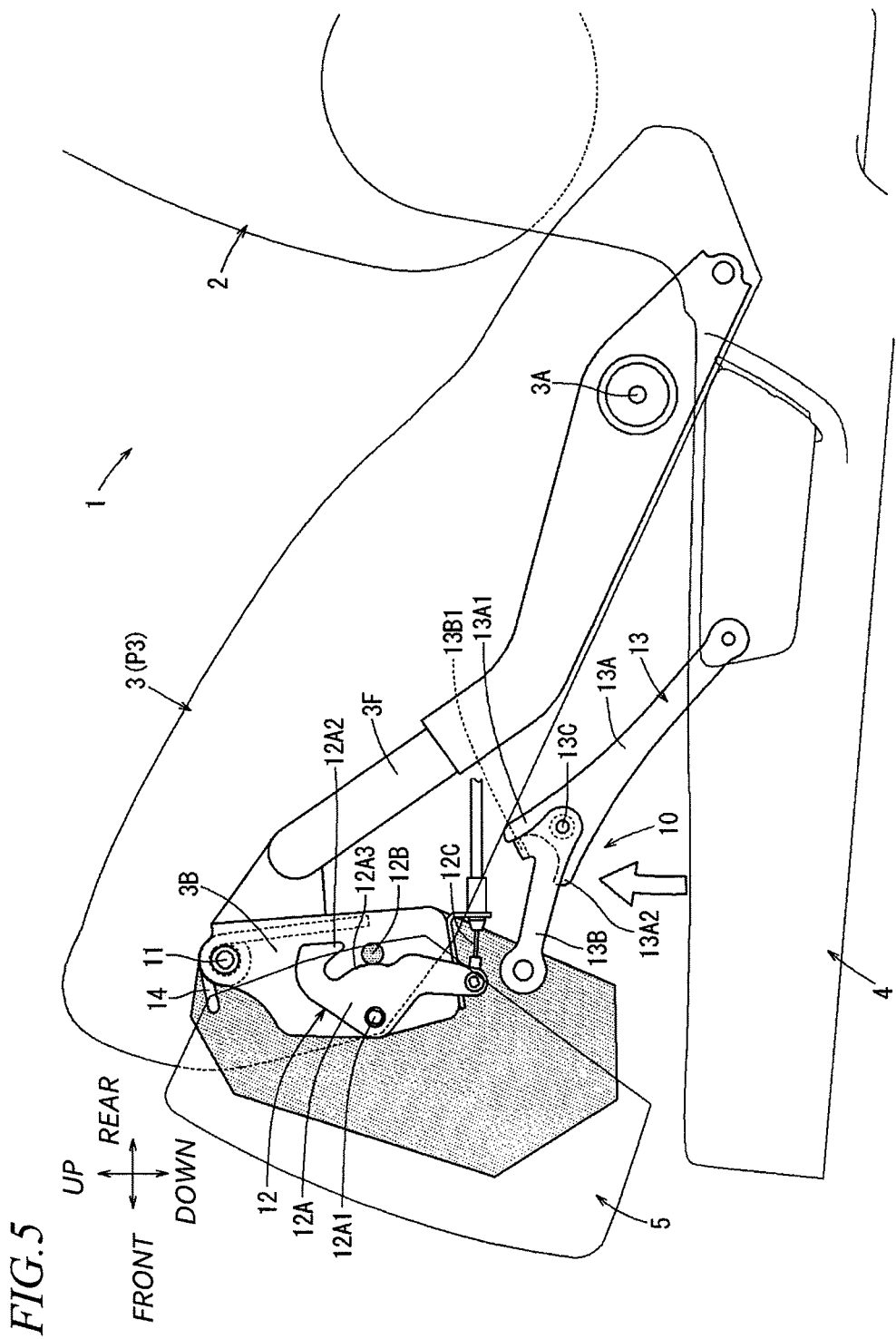
FIG. 5 is a view schematically illustrating a state where the seat cushion is tipped up to a second intermediate position and supported by an operation link.

When the seat cushion 3 is tipped up to a second intermediate position P3 illustrated in FIG. 5 exceeding the first intermediate position P2 illustrated in FIG. 4, the operation link 13 is switched to a state where the engaging piece 13B1 of the second link 13B abuts on the first protruding piece 13A1 of the first link 13A, and then the ottoman 5 can be operated with respect to the tipping-up movement of the seat cushion 3 to be retracted from the base 4 about the hinge shaft 11 which is a joint point to the support bracket 3B.

Figure 6:
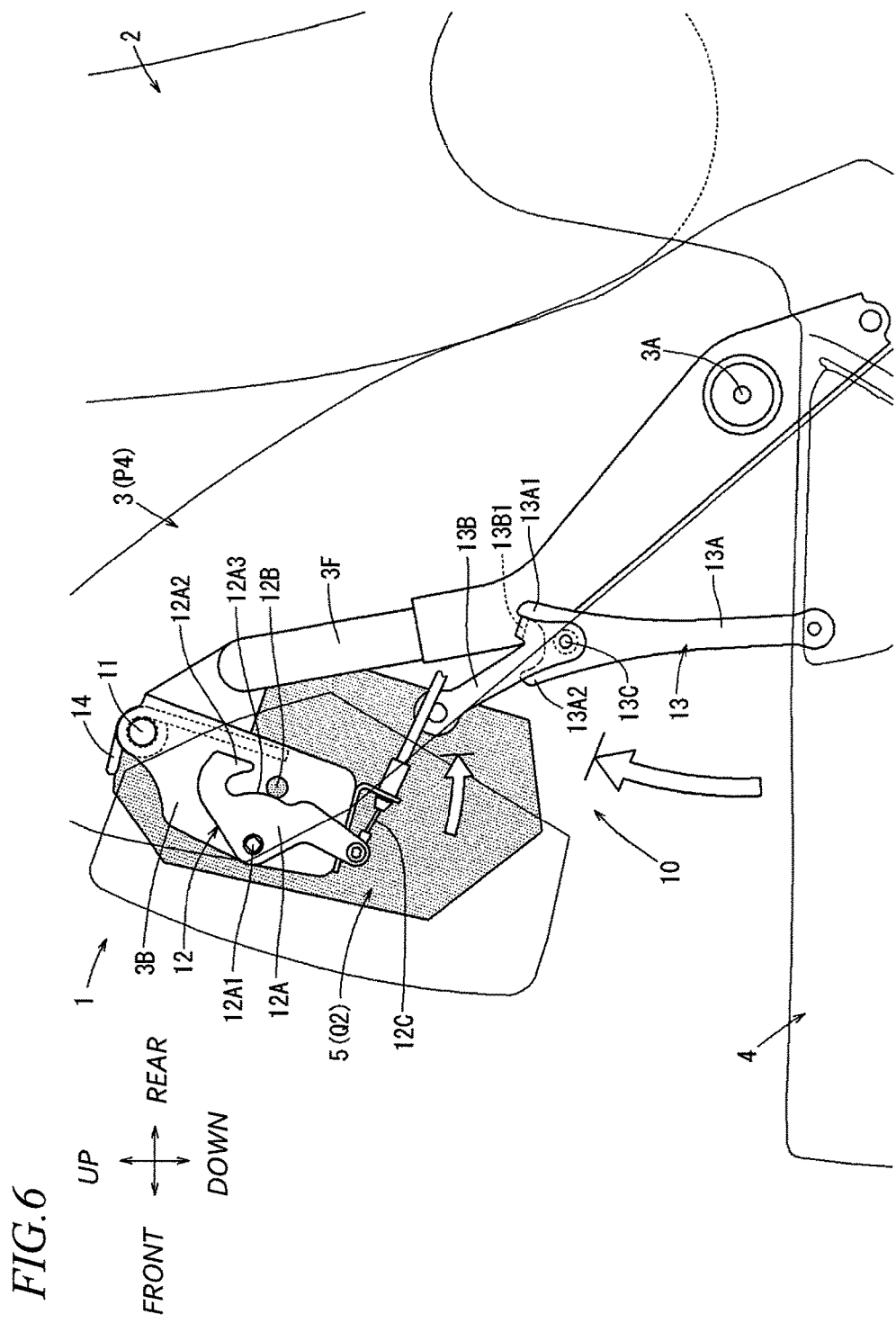
FIG. 6 is a view schematically illustrating a state where the seat cushion is tipped up to a predetermined tip-up position and an ottoman is retracted toward a folding position.

Therefore, when the seat cushion 3 is tipped up from the second intermediate position P3 illustrated in FIG. 5 to the predetermined tip-up position P4 illustrated in FIG. 6, the ottoman 5 is retracted from the operation link 13 to the folding position Q2 where being folded to the bottom of the seat cushion 3 and is held in the retracted state.

When the seat cushion 3 falls down from the predetermined tip-up position P4 in FIG. 6 to the seating position P1 on the base 4 illustrated in FIG. 3, the operation link 13 operates such that the engaging piece 13B1 of the second link 13B abuts on the second protruding piece 13A2 of the first link 13A in the middle of the falling-down, and the ottoman 5 is forcibly pressed toward the initial position Q1 along the falling-down of the seat cushion 3. Therefore, even if a defect is caused by friction resistance or interference from an object and thus the ottoman 5 is difficult to be smoothly returned from the folding position Q2 to the initial position Q1, the ottoman 5 can be appropriately returned toward the initial position Q1 by a pushing operation of the operation link 13.

When the seat cushion 3 is pulled back to a position exceeding the first intermediate position P2 illustrated in FIG. 4, the ottoman 5 is operated such that the hook 12A is returned to the hung state to the striker 12B by an urging force and thus returned to the state at the initial position Q1 to be fixed to the support bracket 3B.

As illustrated in FIG. 3, the torsion spring 14 is in a state where the ottoman 5 is rotatably urged in the clockwise direction with the hinge shaft 11 as the center in normal condition with respect to the support bracket 3B. With this configuration, the ottoman 5 is tipped up to the first intermediate position P2 of the seat cushion 3 as illustrated in FIG. 4. Therefore, even when the hook 12A of the lock portion 12 comes out of the striker 12B and the rotation about the hinge shaft 11 is switched to be a free state, the striker 12B is held on the support bracket 3B in the state substantially at the same rotational position as the initial position Q1 as the state of being pressed to the arc surface portion 12A3 of the hook 12A by an urging force of the torsion spring 14.

Therefore, even if the ottoman 5 is released from the lock state of the lock portion 12, the ottoman 5 is gradually folded to the folding position Q2 illustrated in FIG. 6 without fluttering about the hinge shaft 11 as the operation link 13 is retracted along the tipping-up rotation of the seat cushion 3. With the torsion spring 14, when the seat cushion 3 falls down from the predetermined tip-up position P4 in FIG. 6 to the seating position P1 on the base 4 illustrated in FIG. 3, the ottoman 5 is pressed and moved toward the initial position Q1 by the urging force of the torsion spring 14 after the engaging piece 13B1 of the second link 13B of the operation link 13 reaches the rotational position away from the first protruding piece 13A1 of the first link 13A and is held in the position.

As described in detail in the above, the seat 1 according to this embodiment is configured as follows. In other words, the vehicle seat (the seat 1) includes the seat cushion (the seat cushion 3) which is the seating portion, the ottoman (the ottoman 5) which is connected to the front portion of the seat cushion (the seat cushion 3), and the base (the base 4) which supports the seat cushion (the seat cushion 3) to a vehicle floor in a state where the seat cushion is tipped up from the seating position (the seating position P1) to the predetermined tip-up position (the predetermined tip-up position P4) and to the rear side.

The vehicle seat (the seat 1) includes the folding mechanism (the folding mechanism 10) which moves the ottoman (the ottoman 5) from the initial position (the initial position Q1) of the front portion of the seat cushion (the seat cushion 3) to the folding position (the folding position Q2) of the bottom of the seat cushion (the seat cushion 3) as the seat cushion (the seat cushion 3) is tipped up. The folding mechanism (the folding mechanism 10) includes the hinge portion (the hinge shaft 11) which rotatably connects the ottoman (the ottoman 5) to the front portion of the seat cushion (the seat cushion 3), the lock portion (the lock portion 12) which locks the rotation of the ottoman (the ottoman 5) about the hinge portion (the hinge shaft 11) to the initial position (the initial position Q1), and the operation link (the operation link 13) which is connected between the ottoman (the ottoman 5) and the base (the base 4) and retracts the ottoman (the ottoman 5) from the initial position (the initial position Q1) to the folding position (the folding position Q2) as the seat cushion (the seat cushion 3) is tipped up.

The lock portion (the lock portion 12) is structured such that the rotation of the ottoman (the ottoman 5) is locked to the initial position (the initial position Q1) in a state where the seat cushion (the seat cushion 3) is at the seating position (the seating position P1), but releases the lock when the seat cushion (the seat cushion 3) is tipped up to the first intermediate position (the first intermediate position P2). The operation link (the operation link 13) includes an adjustment portion (the bending and stretching structure) which releases the relative distance in movement generated between the ottoman (the ottoman 5) and the base (the base 4) when the seat cushion (the seat cushion 3) is tipped up from the seating position (the seating position P1) to the second intermediate position (the second intermediate position P3) exceeding the first intermediate position (the first intermediate position P2). The ottoman (the ottoman 5) is retracted from the initial position (the initial position Q1) to the folding position (the folding position Q2) by the relative distance in movement generated between the ottoman (the ottoman 5) and the base (the base 4) when the seat cushion (the seat cushion 3) is tipped up from the second intermediate position (the second intermediate position P3) to the predetermined tip-up position (the predetermined tip-up position P4).

With such a configuration, the operation link (the operation link 13) retracting the ottoman (the ottoman 5) toward the folding position (the folding position Q2) as the seat cushion (the seat cushion 3) is tipped up can be operated not to retract the ottoman (the ottoman 5) up to the second intermediate position (the second intermediate position P3) exceeding the first intermediate position (the first intermediate position P2) where the lock portion (the lock portion 12) is released and the seat cushion (the seat cushion 3) is tipped up. Therefore, even when the releasing position of the lock portion (the lock portion 12) is deviated, the deviation can be absorbed by a releasing region until the operation link (the operation link 13) starts to retract the ottoman (the ottoman 5). The ottoman (the ottoman 5) can be switched to a folded state more suitably while the tipping-up operation of the seat cushion (the seat cushion 3) is performed.

The lock portion (the lock portion 12) includes the hook (the hook 12A) which is provided in the front portion of the seat cushion (the seat cushion 3) and the striker (the striker 12B) which is provided in the ottoman (the ottoman 5). The lock portion (the lock portion 12) locks the rotation of the ottoman (the ottoman 5) by being engaged with the striker (the striker 12B) of the hook (the hook 12A). The hook (the hook 12A) comes out of the engagement with the striker (the striker 12B) so as to release the locking of the ottoman (the ottoman 5) through a cable operation by the relative distance in movement generated between the hook (the hook 12A) and the base (the base 4) by the tipping-up operation from the seating position (the seating position P1) of the seat cushion (the seat cushion 3) to the first intermediate position (the first intermediate position P2).

In this way, the lock portion (the lock portion 12) can be released from the locked state at the initial position (the initial position Q1) of the ottoman (the ottoman 5) at an appropriate timing according to a tipping-up distance of the seat cushion (the seat cushion 3) with a simple configuration using the cable operation.

Further, there are provided the urging portion (the torsion spring 14) which urges the ottoman (the ottoman 5) with respect to the front portion of the seat cushion (the seat cushion 3) to a direction opposite the retracting direction of the operation link (the operation link 13), and the regulation portion (the arc surface portion 12A3) which regulates a maximum rotational position in a direction opposite the ottoman (the ottoman 5) at the time of releasing the lock portion (the lock portion 12) to the initial position (the initial position Q1).

With such a configuration, even when the adjustment portion (the bending and stretching structure) is set in the operation link (the operation link 13), the ottoman (the ottoman 5) is returned to the initial position (the initial position Q1) by the urging force of the urging portion (the torsion spring 14) by returning the seat cushion (the seat cushion 3) from the predetermined tip-up position (the predetermined tip-up position P4) to the seating position (the seating position P1), so that the ottoman (the ottoman 5) can be appropriately locked by the lock portion (the lock portion 12).

The operation link (the operation link 13) is formed in the bending link which has the joint (the joint 13C) in the intermediate portion in the longitudinal direction and can be bent and stretched to link. A bending and stretching structure of the bending link forms the adjustment portion.

In this way, since the operation link (the operation link 13) is formed in the bending link, the operation link (the operation link 13) can be bent compactly between the ottoman (the ottoman 5) and the base (the base 4) when the seat cushion (the seat cushion 3) is returned to the seating position (the seating position P1). An adjustment amount of the adjustment portion can be simply adjusted by setting a regulation angle of the bending of the operation link (the operation link 13).

Hitherto, the embodiment according to the present disclosure have been described using one example, however various modifications can be made. For example, the vehicle seat of the invention may also be applied to a seat other than the vehicle rear seat, and may be widely applied to seats used for other vehicles such as a railed vehicle, an airplane, and a ship.

The hinge portion of the folding mechanism rotatably connecting the ottoman to the front portion of the seat cushion may be formed to have a single shaft, or may be formed in a link structure such as a four-link mechanism and a slide crank mechanism. Besides the structure for engaging or releasing the hook with respect to the striker as described in the embodiment, various locking structures such as a structure for engaging or releasing a claw with respect to a hole and a structure for locking using a sliding friction resistance caused by pressing may be used as the lock portion locking the rotation of the ottoman about the hinge portion to the initial position.

Besides the bending link described in the embodiment, the operation link retracting the ottoman from the initial position to the folding position along the tipping-up operation of the seat cushion may be formed in a simple link which has a long hole to release the relative distance in movement within a certain range along the tipping-up operation of the seat cushion. In a case where the operation link is formed in the bending link, the ottoman may be configured to be retracted by extending the bending link.

Besides the torsion spring, the urging portion which urges the ottoman in a direction opposite the retracting direction of the operation link may be formed of various springs such as a tension spring or an elastic body such as rubber other than the springs. The regulation portion which regulates a maximum rotational position in a direction opposite the ottoman at the time of releasing the lock portion to the initial position is not necessarily configured between the components of the lock portion, and may be configured between other members provided between the ottoman and the front portion of the seat cushion.

What is claimed is:

1. A vehicle seat, comprising:
   a seat cushion that serves as a seating portion which receives a load of an occupant;
   an ottoman that is connected to a front portion of the seat cushion;
   a base that supports the seat cushion on a vehicle floor in a seating position at which the seat cushion receives the occupant and in a tip-up position at which the seat cushion is tipped up rearward from the seating position; and
   a folding mechanism that moves the ottoman between an initial position at which the ottoman is positioned at the front portion of the seat cushion and a folding position at which the ottoman is retracted beneath the seat cushion in accordance with a movement of the seat cushion from the seating position and the tip-up position,
   wherein the folding mechanism includes:
     a hinge portion that rotatably connects the ottoman to the front portion of the seat cushion;
     a lock portion that locks rotation of the ottoman about the hinge portion at the initial position;
     an operation link that connects the ottoman and the base and retracts the ottoman from the initial position to the folding position as the seat cushion is tipped up, and
     wherein the lock portion includes a cable that connects a portion of the lock portion to the base, such that the lock portion is configured to lock the rotation of the ottoman at the initial position in a state where the seat cushion is at the seating position and to unlock the rotation of the ottoman in a state where the seat cushion is tipped up to a first intermediate position which is set between the initial position and the tip-up position,
   wherein the operation link includes an adjustment portion that adjusts a separation movement amount of the ottoman with respect to the base during the movement of the seat cushion between the seating position and a second intermediate position which is set between the first intermediate position and the tip-up position, and
   wherein the operation link retracts the ottoman from the initial position to the folding position during the movement of the seat cushion between the second intermediate position and the tip-up position.

2. The vehicle seat according to claim 1,
   wherein the lock portion includes a hook provided in the front portion of the seat cushion and a striker provided in the ottoman, and
   wherein the lock portion locks the rotation of the ottoman when the hook is engaged with the striker and unlocks the ottoman by releasing the hook from the striker with a cable that is attached to the hook.

3. The vehicle seat according to claim 1 further comprising:
   an urging portion that urges the ottoman to the front portion of the seat cushion in a direction opposite a retracting direction of the operation link; and
   a regulation portion which regulates a maximum rotational position in the opposite direction of the ottoman at the time of releasing the lock portion to the initial position.

4. The vehicle seat according to claim 1,
   wherein the operation link includes a bending link which has a joint in an intermediate portion in a longitudinal direction and is capable of linking in a bending and stretching shape, the bending link serves as the adjustment portion by a bending and stretching movement of the bending link.

5. A vehicle seat, comprising:
   a seat cushion that serves as a seating portion which receives a load of an occupant;
   an ottoman that is connected to a front portion of the seat cushion;
   a base that supports the seat cushion on a vehicle floor in a seating position at which the seat cushion receives the occupant and in a tip-up position at which the seat cushion is tipped up rearward from the seating position; and
   a folding mechanism that moves the ottoman between an initial position at which the ottoman is positioned at the front portion of the seat cushion and a folding position at which the ottoman is retracted beneath the seat cushion in accordance with a movement of the seat cushion from the seating position and the tip-up position,
   wherein the folding mechanism includes:
     a hinge portion that rotatably connects the ottoman to the front portion of the seat cushion;
     a lock portion that locks rotation of the ottoman about the hinge portion at the initial position;
     an operation link that connects the ottoman and the base and retracts the ottoman from the initial position to the folding position as the seat cushion is tipped up,
     wherein the lock portion is configured to lock the rotation of the ottoman at the initial position in a state where the seat cushion is at the seating position and to unlock the rotation of the ottoman in a state where the seat cushion is tipped up to a first intermediate position which is set between the initial position and the tip-up position,
   wherein the operation link includes an adjustment portion that adjusts a separation movement amount of the ottoman with respect to the base during the movement of the seat cushion between the seating position and a second intermediate position which is set between the first intermediate position and the tip-up position, and wherein the operation link retracts the ottoman from the initial position to the folding position during the movement of the seat cushion between the second intermediate position and the tip-up position, the vehicle seat further comprising:

an urging portion that urges the ottoman to the front portion of the seat cushion in a direction opposite a retracting direction of the operation link; and a regulation portion which regulates a maximum rotational position in the opposite direction of the ottoman at the time of releasing the lock portion to the initial position.

6. A vehicle seat, comprising:

a seat cushion that serves as a seating portion which receives a load of an occupant;

an ottoman that is connected to a front portion of the seat cushion;

a base that supports the seat cushion on a vehicle floor in a seating position at which the seat cushion receives the occupant and in a tip-up position at which the seat cushion is tipped up rearward from the seating position; and a folding mechanism that moves the ottoman between an initial position at which the ottoman is positioned at the front portion of the seat cushion and a folding position at which the ottoman is retracted beneath the seat cushion in accordance with a movement of the seat cushion from the seating position and the tip-up position, wherein the folding mechanism includes:

a hinge portion that rotatably connects the ottoman to the front portion of the seat cushion;

a lock portion that locks rotation of the ottoman about the hinge portion at the initial position;

an operation link that connects the ottoman and the base and retracts the ottoman from the initial position to the folding position as the seat cushion is tipped up, wherein the lock portion is configured to lock the rotation of the ottoman at the initial position in a state where the seat cushion is at the seating position and to unlock the rotation of the ottoman in a state where the seat cushion is tipped up to a first intermediate position which is set between the initial position and the tip-up position, wherein the operation link includes an adjustment portion that adjusts a separation movement amount of the ottoman with respect to the base during the movement of the seat cushion between the seating position and a second intermediate position which is set between the first intermediate position and the tip-up position, wherein the operation link retracts the ottoman from the initial position to the folding position during the movement of the seat cushion between the second intermediate position and the tip-up position, and wherein the operation link includes a bending link which has a joint in an intermediate portion in a longitudinal direction and is capable of linking in a bending and stretching shape, the bending link serves as the adjustment portion by a bending and stretching movement of the bending link.

* * * * *